United States Patent [19]

Clements

[11] Patent Number: 5,275,769

[45] Date of Patent: Jan. 4, 1994

[54] METHOD OF FORMING A VANDAL-RESISTANT SEAT

[75] Inventor: John A. Clements, Noble Park, Australia

[73] Assignee: Henderson's Industries Pty. Ltd., Victoria, Australia

[21] Appl. No.: 854,622

[22] PCT Filed: Dec. 10, 1990

[86] PCT No.: PCT/AU90/00585

§ 371 Date: Jun. 11, 1992

§ 102(e) Date: Jun. 11, 1992

[87] PCT Pub. No.: WO91/08886

PCT Pub. Date: Jun. 27, 1991

[30] Foreign Application Priority Data

Dec. 11, 1989 [AU] Australia ............... PJ7824

[51] Int. Cl.$^5$ .............................. B29C 67/22
[52] U.S. Cl. .................. 264/46.4; 264/46.6; 425/812
[58] Field of Search ............ 264/40.3, 46.4, 46.6, 264/46.8; 425/812

[56] References Cited

U.S. PATENT DOCUMENTS

| | | | |
|---|---|---|---|
| 3,647,260 | 3/1972 | Grant et al. | 297/219 |
| 3,647,608 | 3/1972 | Enlow | |
| 4,092,387 | 5/1978 | Pärsson et al. | |
| 4,138,283 | 2/1979 | Hanusa | |
| 4,247,347 | 1/1981 | Lischer et al. | |
| 4,673,613 | 6/1987 | Ward | 264/271.1 |
| 4,904,541 | 2/1990 | Askew | 5/448 |
| 4,923,653 | 5/1990 | Matsuura et al. | 264/40.3 |
| 4,959,184 | 9/1990 | Akai et al. | 264/46.6 |
| 4,965,029 | 10/1990 | Lidy et al. | 264/45.1 |
| 4,976,414 | 12/1990 | Yanagishita | 264/40.3 |
| 5,085,487 | 2/1992 | Weingartner et al. | 5/481 |
| 5,116,556 | 5/1992 | Danton | 264/46.7 |

FOREIGN PATENT DOCUMENTS

| | | |
|---|---|---|
| 5249586 | 9/1986 | Australia . |
| 63-139709 | 6/1988 | Japan . |
| 63-139710 | 6/1988 | Japan . |
| 1465471 | 2/1977 | United Kingdom . |

OTHER PUBLICATIONS

Derwent Abstract Accession No. 88-202002/29, Class Q39, (Honda Motor IND KK) Jun. 11, 1988 (11.06.88).
Derwent Abstract Accession No. 88-202003/29, Class Q17, (Mitsui Toatsu Chem Inc) Jun. 11, 1988 (11.06.88).

*Primary Examiner*—Allan R. Kuhns
*Attorney, Agent, or Firm*—Evenson, McKeown, Edwards & Lenahan

[57] ABSTRACT

A method of manufacturing an article is disclosed which includes an outer fabric material and an inner micro-cellular thermosetting foam plastics material. The method includes facing the outer fabric material, which has been treated on its inner side with a flexible thermosetting plastics material composition, in a mould, closing the mould to define a mould cavity and to deform the fabric material to a predetermined configuration, injecting a foamable flexible thermosetting plastics material composition into the mould, allowing the foamable flexible plastics material to react and completely fill the mould, the pressure of the reaction in the closed spaced of the mould causing the flexible plastics material to bond to the fabric material, allowing the resultant fabric covered micro-cellular foam plastics material to cure, and opening the mould and removing the article.

21 Claims, No Drawings

METHOD OF FORMING A VANDAL-RESISTANT SEAT

The present invention relates to methods of manufacturing laminated articles, in particular to laminated articles that are used as a seat cushion or a seat back support, and more particularly to vandal or damage resistant seats for use on public transport.

A number of vandal resistant seats offered for use in public transport in recent years have been criticised because they are too hard and lack comfort, for example the seat described in Australian Patent Application No. Application No. 594,037 (52495/86) uses a polyurethane (V8080) and Moca. Supplied by Uniroyal Aust. Pty. Ltd. this provides a high tensile elastomer with a short "A" hardness of about 75-85 which is used in conjunction with a wire mesh with a wire diameter 0.75 mm. The wire in this construction presents a reasonably stiff form without the elastomer. The addition of the elastomer makes a very stiff and board like seat. The elastomer is hard when moulded into a seat without the wire reinforcement. While mesh of a chain-mail type is mention it would do little to improve the flexibility in this case unless a softer more flexible elastomer were to be used. Moreover, this process uses a material that needs to be kept at elevated temperatures, i.e. in excess of 100° C. and requires a long curing period, for example 2 hours plus post curing for a further 8 hours. Vickers Xatal AU-B-12028/88 describes a solid form seat pan covered by a flat sheet which illustrates the difficulty experienced by others attempting to mould vandal resistant materials into seat shapes and retain the flexibility necessary for some degree of comfort. The method of moulding seat shapes appears to have been abandoned in favour of a solid seat pan.

U.K. Patent G.B. 2,041,742 to J. L. Danton and M. Duret, also teaches a wire reinforced construction, while this produces a softer and more flexible seat it has other manufacturing limitations in that only flat sheets appear to be produced by this method. J. L. Danton and M. Duret in European Patent No. 0,201,419 FIGS. 1-8 describe a method by which a three dimensional seat shape as opposed to a flat sheet may be made. This is done by fixing or moulding the previously manufactured sheet into a rigid plastic or metal frame. Unfortunately a flat sheet fixed in this manner tends to become stiffer unless it can elongate and flex which of course this material cannot. A somewhat hard and uncomfortable seat material results.

Other methods published on the manufacture of vandal or damage resistant seats e.g. U.S. Pat. No. 3,647,608, D. S. Enlow describes a method for producing a softer seat. However it has been found that seats manufactured by this method provide little resistance to damage by puncturing, and are not difficult to slash because the article is made of a foam in the density range that would normally be used for seating i.e. 35-60 Kg. per cubic meter, and reinforced by unconnected randomly oriented wires or metal fibers. Foams of this type have relatively low tensile strength and when used in combination with unconnected wires are not difficult to hack and pull apart, therefore seats manufactured by this method present only limited resistance to attack by vandals. D. S. Enlow in this invention did not consider damage that may be caused by fire from either large or small ignition sources. The overall resistance of articles made by this method are therefore limited.

The current favoured method of manufacturing a vandal resistant seat involves producing a wire reinforced microcellular urethane elastomer seat form, mounted on a board and supported on a fire retardant foam. The seat form then has to be covered by a woollen fabric which is attached to the seat form in a manner that makes the fabric as difficult as possible to remove or damage. The fabric is treated with at least three heavy coats of adhesive. The seat form is also treated with adhesive, and the adhesive is allowed to dry. The seat form and the adhesive coated woollen fabric are then placed in an infra-red oven and heated until tacky to reactivate the adhesive. The woollen fabric is then placed onto the seat form taking care to align the pattern and remove creases. The form is trimmed by pulling the woollen fabric around the corners and sides of the seat form and stapling onto the board. The operation of placing the treated woollen fabric on the seat form and trimming the part is very time consuming and requires a high degree of skill. As will be appreciated, mistakes made during this operation result in very expensive scrap.

The prior art methods that are specific to the manufacture of vandal-resistant seats therefore have a number of limitations.

It is an object of the present invention to alleviate at least some of the aforementioned disadvantages.

The present invention therefore provides a method of manufacturing a formed wire mesh reinforced (vandal resistant) article including an outer fabric material and an inner micro-cellular thermosetting foam plastics material, comprising:

placing the outer fabric material, which has been treated on its inner side with a flexible thermosetting plastics material composition, and a wire mesh in a mould;

closing the mould to define a mould cavity having a predetermined volume and to deform the fabric material and the wire mesh to a predetermined configuration;

injecting a foamable flexible thermosetting plastics material composition into said mould cavity in an amount, such that the unfoamed volume of the material is at least 50% of the volume of the mould cavity and the volume of the mould cavity is up to 50% of the volume that the foamable material would occupy if it were allowed to foam unfettered to its maximum volume.

allowing the foamable flexible plastics material to react and completely fill said mould, the pressure of the reaction in the closed space of the mould causing the flexible plastics material to bond to the fabric material;

allowing the resultant fabric covered micro-cellular foam plastics material to cure;

opening the mould and removing the article.

The present invention also provides a method of manufacturing a formed wire mesh reinforced article including an outer fabric material and an inner micro-cellular foam thermosetting comprising plastics material reinforced by a metal wire mesh embedded therein comprising placing the outer fabric material, treated on its inner side with a flexible thermosetting plastics material composition in a mould;

closing the mould to deform the fabric material to a predetermined configuration;

opening the mould and inserting the wire mesh on the inner side of the fabric;

closing the mould to form an enclosed mould cavity having a predetermined volume and injecting a foamable thermosetting plastics material composition into the mould cavity in an amount, calculated as the unfoamed volume, of at least 50% by volume of the mould cavity and in an amount, calculated as unfettered fully expanded foam volume, such that the volume of the mould cavity is up to 50% by volume of the volume of the fully expanded foam volume;

allowing the foamable flexible plastics material to react and completely fill the mould, the pressure of the reaction in the closed space of the mould causing the flexible plastics material to surround the wire mesh and to bond to the fabric material;

allowing the resultant fabric covered reinforced micro-cellular foam plastics material to cure;

opening the mould and removing the article.

The present invention further provides a method of manufacturing a formed article comprising:

placing a preform having an outer fabric material, treated on its inner side with a flexible thermosetting plastics material composition and an inner metal mesh in a mould;

injecting a foamable flexible thermosetting plastics material composition into said mould cavity in an amount, such that the unfoamed volume of the material is at least 50% of the volume of the mould cavity and the volume of the mould cavity is up to 50% of the volume that the foamable material would occupy if it were allowed to foam unfettered to its maximum volume;

allowing the foamable flexible plastics material to react and completely fill said mould, the pressure of the reaction in the closed space of the mould causing the flexible plastics material to bond to the fabric material;

allowing the resultant fabric covered micro-cellular foam plastics material to cure;

opening the mould and removing the article.

Preferably the volume of unexpanded foamable material injected into the mould cavity is from 60% to 99% of the volume of the cavity, and more preferably is from 75% to 95% of the volume of the cavity.

Preferably the mould includes a vent to permit air to escape from the mould cavity as it is displaced due to the injection of the foamable flexible thermosetting plastics material. Preferably the foamable flexible thermosetting plastics material is injected into the mould at the top of the mould and the vent is at the bottom of the mould.

The invention also relates to articles manufactured in accordance with the method of manufacture.

The flexible thermosetting plastics material is selected for compatibility with the foamable plastics material so that maximum bond strength between the outer fabric material and the inner, preferably wire reinforced foamable plastics material is achieved.

In one preferred aspect the fabric material and wire mesh are placed in the mould with the mould in a horizontal plane. When closed, the mould is tilted to a vertical plane, and the foamable plastics material is injected into the top of the mould and flows down through the mould under the influence of gravity.

The mould is so constructed as to allow the injected foamable plastics material to push the air in the mould down through the mould and vent out of the bottom of the mould. The gel or setting time of the foamable plastics material is timed to gel or set as it enters the vents at the bottom of the mould. Filling of the mould continues until the foamable plastics material overflows via a vent into channels provided for this purpose, filling continues until all settling in the channel stops.

The product is allowed to cure then removed from the mould.

In an alternative process which produces a more resilient and "softer feel" product the amount of foamable flexible plastics material injected into the mould is preferably from 50% to 100% by volume of the flexible plastics material in a unexpanded or unfoamed state as compared to the total volume of the mould with from 60% to 99% v/v being preferred and from 75% to 95% v.v. being particularly preferred. The reaction of the foamable flexible plastics material, in the confined space (of up to 50% of the volume of the foamable flexible plastics material volume if it were permitted to foam and expand unfettered) produces the micro-cellular foam plastics material integrally bonded to the outer fabric.

By moulding the foamable plastics material which is preferably wire reinforced directly onto the woollen fabric, thereby forming the fabric material to a predetermined shape, the need for skill is greatly reduced, and the time required to produce a seat cushion or seat back is reduced by approximately 15 to 20 minutes per part. Thus, the method of the invention provides improved production methods and a reduction in the time taken to produce an article.

One feature of the invention is the high bond strength of the (preferably woollen) fabric material to the foamable plastics material. This is achieved by the application of a urethane adhesive to the fabric. An example of a suitable adhesive is No. 2518 plus isocyanate No. 2518/7. Available from Beta Chemicals Melbourne Victoria, or Daltobond VF/AR available from I.C.I. Adhesives. High bond strengths are achieved by the application of heavy coats of adhesive by spraying. Three heavy coats are generally required. The adhesive is applied so as to penetrate to about 50% and not less than 30% of the depth of the fabrics fibres so as to bond the fabric material into one continuous sheet. In this manner maximum mechanical bonding is obtained. The isocyanate will also react with moisture present in the fabrics fibres thereby improving the bond. Fabrics back coated in this manner show a marked improvement in resistance to wear by abrasion. The preferred fabrics of the present invention, predominantly selected for aesthetic reasons, are moquette type fabrics and denser woven woollen fabrics.

In an alternate embodiment, the preformed fabric is transferred to a second mould where wire is inserted (on the inner side of the fabric). The mould is closed and a foamable plastics material composition is injected to completely fill the mould.

By allowing the foamable plastics material to react, the pressure of the reaction in the closed space of the mould causes the flexible plastics material to surround the wire mesh and to bond to the fabric material.

The resultant fabric covered reinforced microcellular foam plastics material is allowed to cure in the normal manner.

The wire mesh may be an ordinary fly-wire type mesh or a "cyclone fence" type mesh, which is favoured as it provides better flexibility in the finished article.

The foamable plastics material is preferably a polyurethane foam or a silicon(e) foam. The polyurethane foam is preferably a fire retardant polyurethane foam as will be described in greater detail hereinafter.

A further aspect contemplated by the present invention is to ensure the maximum level of fire performance possible, i.e. no spread of flame, the ability to withstand attack from large ignition sources to produce low levels of smoke and toxic gases during combustion, and to provide the maximum time from onset of ignition to the development of smoke in order to allow people to either escape the area of the fire or put out the fire.

The invention refers to polyurethane materials that can be used at room temperatures i.e. preferably in the range 25°–50° C. The preferred polyurethane materials of the invention require only short mould resident times i.e. 3–6 minutes from pour to demould. The preferred material should require no post curing. The invention refers to a fabric covered preferably wire reinforced microcellular polyurethane seat cover. The seat cover is moulded in one shot i.e. the fabric covering material, wire reinforcement if required, and elastomer are moulded and bonded together in the mould.

As mentioned before, the preferred materials should be highly fire retardant or capable of being made so. The fire retardant properties should include low smoke low toxic products of combustion.

Such a material is preferably a polyether based polyurethane derived from a Diol- or a Triol-based polyol where at least 50% of the hydroxyl end groups are primary end groups and an isocyanate. Preferably a polyurethane foam including a fire retardant system of a chlorinated paraffin, sodium tetra-borate, antimony trioxide, and alumina trihydrate. Polyols used in making the present invention are preferably diols or triols, having a molecular weight of about 2500–7500, and at least 50% of the hydroxyl end groups being primary hydroxyl end groups. Examples of diols or triols well suited to the present invention are linear and branched polyoxypropylene polyols block copolymers of ethylene oxide and propylene oxide, and polyol grafts of ethylenically unsaturated monomers such as in particular styrene and acrylonitrile on the aforementioned polyols. These polyols will be substantially free from functional groups other than hydroxyl groups and as mentioned above, will be in the main tipped with primary hydroxyl groups. Most preferred at least about 78% of the hydroxyl groups are primary hydroxyl end groups. Examples of suitable polyols available commercially are CP4701. (Dow Chemicals), Niax 11-34 (Union Carbide), Desmophen 3900 (Bayer), propylan M12 (Lankro Chemicals), and Daltocell T 32-75 (I.C.I.). Examples of suitable grafted polyols of polymer polyols or PHD. polyols (i.e. dispersions of polyvinyl or polyurea compounds in diol or triol polyols) commercially available are Niax 34-28 (Union Carbide), Pluracol 518 (BASF-Wyandotte) and PU 3119 (Bayer). E609 (Union Carbide).

Water is usually added to the blend as a blowing agent in order to create a foam plastics material as it reacts with excess isocyanate to liberate carbon dioxide gas. Most commercial polyols have between 0.05–0.1% water in them and usually about 0.08% the water normally present in the polyol is all that is required for minimum blowing.

If a totally non foaming elastomer is required it would be necessary to place the polymer in a vacuum oven and heat to about 80°–90° C. for 4–8 hours to remove all air and moisture. As the polymer is confined within the mould and the mould is filled, the pressure of the reaction in the closed space of the mould allows very little foaming to take place. The microcellular elastomers made according to the invention have performed as described later. A non cellular elastomer is not considered to offer any advantage.

The preferred isocyanates are toluene di-isocyanate (TDI) polymethylene polyphenyl iso-cyanate and diphenylmethan di-isocyanate, both of which are known as MDI, and mixtures of these two isocyanates. The invention does not preclude the use however of other aromatic and aliphatic isocyantes known in the art. The amount of isocyanate required is regulated by the stoichiometry of the reaction, an index of 100–120 giving microcellular elastomers with optimum physical properties.

The foamable plastics material is preferably a polyurethane foam. The polyurethane is preferably a fire retardant polyurethane foam, including a borax and/or hydrated alumina and antimony trioxide and a chlorinated paraffin. The flame retardant system of the present invention includes about 5–25 parts by weight of antimony trioxide, about 10–60 parts by weight alumina trihydrate, about 10–80 parts by weight of sodium tetraborate, and about 20–80 parts by weight of a chlorinated paraffin, based on 100 parts by weight of the polyol. The antimony trioxide will generally be present in the formulation in an amount ranging from 5–20 parts by weight, preferably from about 7–15 and most preferably about 12 parts. The chlorinated paraffin will usually be present in an amount ranging from 25–65 parts by weight, preferably from about 40–60 parts, and most preferably 40–50 parts. Alternatively the paraffin can be expressed in terms of the chlorine content and generally there is present about 20–40 parts, preferably about 25–35 parts by weight of chlorine. The term "chlorinated paraffin" includes a single chlorinated paraffin or mixtures thereof.

Chlorinated paraffins have a chlorine content ranging from 30%–70%. A chlorinated paraffin with a chlorine content of about 60% is preferred. The chlorinated paraffins may be either liquid or solid for example CERERCLOR 70 or 70 L. (CERECLOR is a Registered Trade Mark of I.C.I.) the liquid chlorinated paraffin is preferred.

Catalysts, promotors and amines known in the art are used in the formulation of foam polyurethane compositions described above.

Other elastomers and foams which may be used in place of polyurethane elastomers and polyurethane foam materials are silicone elastomers such as RTU.627 and silicone foams RTF.762 and RTF.8510 produced by General Electric, Silicone Products Division, Waterford, N. Y. 12188. These silicone elastomers and foams have excellent fire retardant properties. The silicone elastomer/foam products are made in similar manner to the polyurethane elastomer/foam products described earlier.

In one particularly preferred form of the invention, the fabric covered steel mesh reinforced micro-cellular foam when moulded forms a hollow case, the lower 10 mm. of the outer circumference of which is not covered by the fabric material. The hollow case is then mounted on a 10 mm. plywood board by stapling through the lower 10 mm. of the hollow case provided for this purpose and into the edge of the plywood board. The plywood board may be made fire retardant by treatment with known fire retardant chemicals for timber. The fabric cover which extends about 100 mm. past the lower edge of the fabric covered wire reinforced hollow case is then pulled over the lower edge of the hollow case and stapled to the underside of the plyboard by two continuous rows of staples. The woollen cover stapled in this manner extends about 25-30 mm onto the blyboard base. The excess woolen fabric is then trimmed off. The staples pass through and around the wire reinforcement to attach the seat form firmly to the plywood board.

By way of example only two foamable plastics material (elastomer) formulations were chosen. The elastomers were chosen so that the tensile strength of the elastomer referred to as No. 1 is a little higher than the tensile strength of the woolen fabric material and the elastomer referred to as No. 2 is a little below the tensile strength of the woollen fabric material.

Elastomer No. 1 SHORE "A" hardness 45-50.
Elastomer No. 2 SHORE "A" hardness 335-40.

In order to maintain flexibility, a flexible wire mesh supplied by Hunter Wire Products was selected with pitch as described in Australian Patent No. 41933. This allowed for an optimum elastomer thickness of 5-6 mm, the intention being to reduce the hardness and increase the flexibility. A further feature of the invention is to choose materials so as to achieve maximum bond strength between the elastomer and the woollen fabric.

Test samples were produced to evaluabe the peel strength of the elastomers. Test samples 5 mm*60 mm*240 mm, reinforced with wire supplied by Hunters Wire Products and covered with a pure wool fabric. The samples were subjected to a standard "T" peel test as outlined in attached sheet Q.P.5.

Test samples referred to as elastomer No. 1 SHORE "A" 45-50 had peel strengths in the range 120-150 newtons.

Test samples referred to as Elastomer No. 2 SHORE "A" 35-40 had peel strengths in the range 65-90 Newtons.

A number of the tests on test samples of elastomer No. 1 ended prematurely due to the wool fibres pulling apart. This mode of failure is ideal where the wool pulls apart rather than peels away, the elastomer and the bond being stronger than the tensile strength of the fabric.

For the elastomer referred to as No. 2, the samples peeled uniformly behind the joint line, in this case the fabric to elastomer joint line being stronger than the tensile strength of the elastomer.

While it would appear that the harder material sample No. 1 would be most preferable from the vandal resistant point of view, trials conducted so far have indicated that both elastomers have performed equally in test situations, the No. 2 elastomer being preferred for its extra flexibility and softer peel. In this case when the softer material is made into a seat where there are no loose edges for the vandal to start a tear, the soft elastomer No. 2 is as difficult to start a tear as elastomer No. 1. In order to start a tear a tri-angular cut must first be made and then a corner must be dug or prised up so that a section of the fabric cover can be peeled away. In trials this has proved very difficult.

EXAMPLES OF FORMULATIONS

|  | P.B.W. |
|---|---|
| EXAMPLE 1. | |
| E.609 | 100.0 |
| CERECLOR 70L | 35.0 |
| SODIUM TETRABORATE | 15.0 |
| ALUMINA TRIHYDRATE | 15.0 |
| ANTIMONY TRIOXIDE | 15.0 |
| THORCAT 535 | 1.0 |
| ISOCYANATE VM25 | 7.2 |
| EXAMPLE 2. | |
| E.609 | 60.0 |
| CP. 4701 | 40.0 |
| CERECLOR 70L | 35.0 |
| SODIUM TETRABORATE | 15.0 |
| ALUMINA TRIHYDRATE | 15.0 |
| ANTIMONY TRIOXIDE | 15.0 |
| THORCAT 535 | 1.0 |
| ISOCYANATE VM25 | 9.2 |
| EXAMPLE 3. | |
| POLYOL E609 | 60.0 |
| VORANOL 4701 | 40.0 |
| DR.437 | 21.5 |
| WATER | 2.5 |
| CERERCLOR 70L | 50.0 |
| $Al_2O_3$—$3H_2O$ ALUMINIUM TRIHYDRATE | 15.0 |
| $Sb_2O_3$ ANTIMONY TRYOXIDE | 10.0 |
| $Na_2B_4O_7$ $10H_2O$ SODIUM TETRABORATE | 15.0 |
| ISOCYANATE VM25 @ 105 INDEX | 62.5 |

E609 Polymer Polyol - Supplied by Union Carbide.
VORANOL 4701 Polyol - Supplied by Dow Chemicals.
DR.437 Catalyst Blend - Supplied by Dow Chemicals.
CERERCLOR 70L Chlorinated Paraffin.
VM.25 Isocyanate M.D.I.
Di-isocyanato-Diphenylmethane - Supplied by I.C.I.

Samples tested at AWTA Textile Testing Melbourne with the following results.

Test method Ats 1000.001 Airbus Industry spec. to evaluate toxic gas and smoke emission. Ats 1000.001

| Smoke emission and toxicity of gases | | | | Maximum requirement | |
|---|---|---|---|---|---|
| Duration | 90 | 240 | 480 secs. | 90 secs. | 240 secs. |
| 1(a) | Non Flaming Test. Minimum Light Transmission (MLT) % | | | | |
| 1. | 78.5 | 40.0 | 0.790 | — | — |
| 2. | 75.0 | 34.5 | 1.300 | | |
| 3. | 66.0 | 25.8 | 0.570 | | |
| 4. | 60.0 | 16.8 | 1.130 | | |
| 1(b) | Specific Optical Density (Ds) | | | 100 | 200 |
| 1. | 14 | 53 | 277 | | |
| 2. | 16 | 61 | 250 | | |
| 3. | 24 | 78 | 296 | | |
| 4. | 29 | 106 | 259 | | |
| 1(c) | Gas Samples | | | ppm. | |
| HF. | *1.5 | *1.5 | | 50 | 50 |
| HCL. | *50 | *50 | | 50 | 500 |
| HCN. | *2 | *2 | | 100 | 150 |
| SO2. | *20 | *20 | | 50 | 100 |
| CO. | | *1000 | *1000 | 3000 | 3500 |
| NO + NO2 | | *2 | *2 | 50 | 100 |
| 2(a) | Flaming Test. Minumum Light Transmission (MLT) % - | | | | |
| 1. | 33.0 | 0.25 | 0.120 | | |
| 2. | 78.5 | 0.27 | 0.091 | | |
| 3. | 57.0 | 0.60 | 0.180 | | |
| 4. | 61.6 | 0.42 | 0.095 | | |
| 2(b) | Specific Optical Density (Ds) | | | 100 | 200 |
| 1. | 63 | 344 | 386 | | |
| 2. | 14 | 3339 | 401 | | |
| 3. | 32 | 293 | 362 | | |
| 4. | 28 | 314 | 399 | | |
| 2(c) | Gas Sampled | | | | ppm |
| HF. | *5 | *5 | | 50 | 50 |
| HCL. | *50 | *50 | | 50 | 500 |
| HCN. | *2 | *20 | | 100 | 150 |
| SO2. | *20 | *20 | | 50 | 100 |
| CO. | | *1000 | *1000 | 3000 | 3500 |
| NO + NO2. | *10 | *10 | | 50 | 100 |

*Less than.

All samples were reinforced with wire mesh and covered with a woollen fabric which had been flame retarded with 8% PFZ.# # Potassium Fluor-Zirconate.

Sample seats were tested to CSIRO protocol for the assessment of fire behavior of furniture using large ignition sources parts 1&2. 300. 400. & 600. Gram Cribs were used on samples made from formulations 1 & 2.

| CRIB MASS | TEST No. | SUSTAINED FLAMING | SUSTAINED SMOLDERING | COMBUSTION REACHES SHELL: | RESULT |
|---|---|---|---|---|---|
| 300 gr | 1. | No | No | No | Pass |
| 300 gr | 2. | No | No | No | Pass |
| 400 gr | 3. | No | No | No | Pass |
| 400 gr | 4. | No | No | No | Pass |
| 600 gr | 5. | No. | S* | No | Pass |
| 600 gr | 6. | No | S* | No | Pass |

S* Smoldering continued for 55 minutes which is close to the limit for the test.

| | Maximum Smoke Obscuration % | | |
|---|---|---|---|
| | BY 5 MIN | BY 10 MIN | BY 15 MIN |
| 300 gm. fireload | 21% | 40% | 40% |
| 300 gm. fireload | 18% | 38% | 40% |
| 400 gm. fireload | 14% | 40% | 45% |
| 400 gm. fireload | 10% | 40% | 45% |
| 600 gm. fireload | 12% | 45% | 60% |
| 600 gm. fireload | 15% | 56% | 65% |

Note in all tests the fire was confined to the immediate area of the ignition source.

The level of smoke when compared to e.g. a fire retardant polyurethane foam seat cushion is considerably lower.

| Fire Test Performed on F.R. Foam Seat | | |
|---|---|---|
| Max. Smoke Obscuration % | | |
| BY 5 MIN | BY 10 MIN | BY 15 MIN |
| 300 gm. fireload 30% | 92% | 92% |

The time from ignition to maximum level of smoke is extended and the overall level of smoke produced is much lower, allowing a longer period for escape or opportunity to put out the fire.

It is thus apparent that the present invention provides an improved and time-saving method of manufacturing vandal resistant seating.

The claims defining the invention are as follows:

1. A method of manufacturing a formed wire mesh reinforced (vandal resistant) article including an outer fabric material and an inner micro-cellular thermosetting foam plastics material, comprising:
   placing the outer fabric material, which has been treated on its inner side with a flexible thermosetting plastics material composition and a wire mesh in a mould;
   closing the mould to define a mould cavity having a predetermined volume and to deform the fabric material and the wire mesh to a predetermined configuration;
   injecting a foamable flexible thermosetting plastics material composition into said mould cavity in an amount, such that the unfoamed volume of the material is at least 50% of the volume of the mould cavity and the volume of the mould cavity is up to 50% of the volume that the foamable material would occupy if it were allowed to foam unfettered to its maximum volume;
   allowing the foamable flexible plastics material to react and completely fill said mould, the pressure of the reaction in the closed space of the mould causing the flexible plastics material to bond to the fabric material;
   allowing the resultant fabric covered micro-cellular foam plastics material to cure; and
   opening the mould and removing the article.

2. A method as claimed in claim 1, in which the volume of unexpanded foamable material injected into the mould cavity is from 60% to 99% of the volume of the cavity.

3. A method as claimed in claim 1, in which the volume of unexpanded foamable material injected into the mould cavity is from 75% to 95% of the volume of the cavity.

4. A method as claimed in claim 1, in which the mould includes a vent to permit air to escape from the mould cavity as it is displaced due to the injection of the foamable flexible thermosetting plastics material.

5. A method as claimed in claim 4, wherein the foamable flexible thermosetting plastics material is injected into the mould at the top of the mould and the vent is at the bottom of the mould.

6. A method as claimed in claim 2, in which the mould includes a vent to permit air to escape from the mould cavity as it is displaced due to the injection of the foamable flexible thermosetting plastics material.

7. A method as claimed in claim 3, in which the mould includes a vent to permit air to escape from the mould cavity as it is displaced due to the injection of the foamable flexible thermosetting plastics material.

8. A method as claimed in claim 5, in which the volume of unexpanded foamable material injected into the mould cavity is from 60% to 99% of the volume of the cavity.

9. A method as claimed in claim 5, in which the volume of unexpanded foamable material injected into the mould cavity is from 75% to 95% of the volume of the cavity.

10. A method as claimed in claim 8, in which the mould includes a vent to permit air to escape from the mould cavity as it is displaced due to the injection of the foamable flexible thermosetting plastics material.

11. A method as claimed in claim 9, in which the mould includes a vent to permit air to escape from the mould cavity as it is displaced due to the injection of the foamable flexible thermosetting plastics material.

12. A method of manufacturing a formed wire mesh reinforced article including an outer fabric material and an inner micro-cellular foam thermosetting comprising placing the outer fabric material, treated on its inner side with a flexible thermosetting plastics material composition in a mould;
   closing the mould to deform the fabric material to a predetermined configuration;
   opening the mould and inserting the wire mesh on the inner side of the fabric;
   closing the mould to form an enclosed mould cavity having a predetermined volume and injecting a foamable thermosetting plastics material composition into the mould cavity in an amount, such that the unfoamed volume of the material is at least 50% of the volume of the mould cavity and the volume of the mould cavity is up to 50% of the volume that the foamable material would occupy if it were allowed to foam unfettered to its maximum volume;

allowing the foamable flexible plastics material to react and completely fill the mould, the pressure of the reaction in the closed space of the mould causing the flexible plastics material to surround the wire mesh and to bond to the fabric material;

allowing the resultant fabric covered reinforced micro-cellular foam plastics material to cure; and opening the mould and removing the article.

13. A method as claimed in claim 10, in which the mould includes a vent to permit air to escape from the mould cavity as it is displaced due to the injection of the foamable flexible thermosetting plastics material.

14. A method as claimed in claim 11, wherein the foamable flexible thermosetting plastics material is injected into the mould at the top of the mould and the vent is at the bottom of the mould.

15. A method of manufacturing a formed article comprising:

placing a preform having an outer fabric material, treated on its inner side with a flexible thermosetting plastics material composition and an inner metal mesh in a mould;

injecting a foamable flexible thermosetting plastics material composition into said mould cavity in an amount, such that the unfoamed volume of the material is at least 50% of the volume of the mould cavity and the volume of the mould cavity is up to 50% of the volume that the foamable material would occupy if it were allowed to foam unfettered to it's maximum volume;

allowing the foamable flexible plastics material to react and completely fill said mould, the pressure of the reaction in the closed space of the mould causing the flexible plastics material to bond to the fabric material;

allowing the resultant fabric covered micro-cellular foam plastics material to cure; and opening the mould and removing the article.

16. A method as claimed in claim 15, in which the volume of unexpanded foamable material injected into the mould cavity is from 60% to 99% of the volume of the cavity.

17. A method as claimed in claim 15, in which the volume of unexpanded foamable material injected into the mould cavity is from 75% to 95% of the volume of the cavity.

18. A method as claimed in claim 15, in which the mould includes a vent to permit air to escape from the mould cavity as it is displaced due to the injection of the foamable flexible thermosetting plastics material.

19. A method as claimed in claim 18, wherein the foamable flexible thermosetting plastics material is injected into the mould at the top of the mould and the vent is at the bottom of the mould.

20. A method as claimed in claim 16, in which the mould includes a vent to permit air to escape from the mould cavity as it is displaced due to the injection of the foamable flexible thermosetting plastics material.

21. A method as claimed in claim 17, in which the mould includes a vent to permit air to escape from the mould cavity as it is displaced due to the injection of the foamable flexible thermosetting plastics material.

* * * * *